(No Model.)
T. O. INMAN.
FRYING PAN.
No. 334,867.    Patented Jan. 26, 1886.
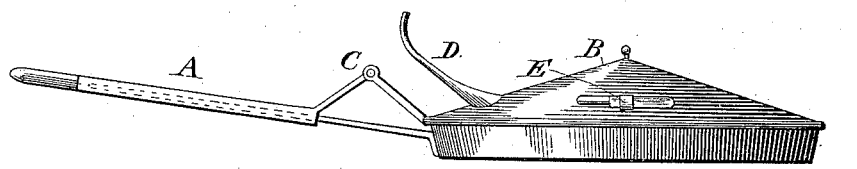
Witnesses:
Jno. J. Reardon
Wesley Coolidge
Thomas O. Inman
Inventor;

United States Patent Office.

THOMAS O. INMAN, OF WILLIAMSPORT, PENNSYLVANIA.

FRYING-PAN.

SPECIFICATION forming part of Letters Patent No. 334,867, dated January 26, 1886.

Application filed October 24, 1883. Serial No. 109,924. (No model.)

*To all whom it may concern:*

Be it known that I, THOMAS O. INMAN, a citizen of the United States, residing in the city of Williamsport and State of Pennsylvania, have invented a new and useful Improvement in Frying-Pans, of which the following is a specification.

My invention relates to improvements in frying-pans in which a hinged lid is so attached as to facilitate convenient use of the same; and it consists of a lid, made of metal or other suitable substance, attached by a hinge to a hollow handle or sleeve fitting over the handle of the pan. Said hollow handle or sleeve is made of such size as to slide over the handle of the pan, by means whereof the lid is readily attached to any pan having an ordinary handle, and is also conveniently removed at pleasure. The lid is fitted with a thumb-piece, by which it can be raised and held in any position required, and it also may be fitted with a clasp to hold a knife or spoon.

The accompanying drawing gives a view of my said invention.

A is a flattened hollow handle or sleeve, through which is inserted the handle of the pan, thereby attaching the lid securely to the pan.

B is the lid, hinged at C to the handle or sleeve A.

D is a thumb-piece, fastened securely to the lid, by means of which the lid may be readily raised and held up as desired.

E is a spring-clasp, attached to the lid, to hold a knife or other implement.

Having thus described my invention, what I claim as new, and desire to secure by Letters Patent, is—

1. In combination with the frying-pan and its handle, the hollow handle or sleeve A, the lid B, and the hinge C, substantially as and for the purposes described.

2. In combination with the frying-pan and its handle, the hollow handle or sleeve A, the lid B, the hinge C, and the thumb-piece D, substantially as set forth, and for the purposes described.

THOMAS O. INMAN.

Witnesses:
J. CLINTON HILL,
JNO. J. REARDON.